United States Patent [19]

Meyer et al.

[11] Patent Number: 5,896,414
[45] Date of Patent: Apr. 20, 1999

[54] METHOD AND APPARATUS FOR PROVIDING CONTROL CHANNEL COMMUNICATIONS FOR AN INFORMATION DISTRIBUTION SYSTEM

[75] Inventors: Thomas John Meyer, Mercer; Bruce James Anderson, Yardville; Tianmin Liu, Mercer, all of N.J.

[73] Assignee: Sarnoff Corporation, Princeton, N.J.

[21] Appl. No.: 08/718,075

[22] Filed: Sep. 17, 1996

[51] Int. Cl.[6] .................................. H04B 1/38; H04L 5/16
[52] U.S. Cl. .......................... 375/222; 455/4.2; 455/5.1; 348/12
[58] Field of Search ............................ 375/222; 348/6, 348/10, 11, 12, 13, 7; 455/3.1, 4.1, 4.2, 5.1, 6.1, 6.2

[56] References Cited

U.S. PATENT DOCUMENTS 4,688,248  8/1987  Tomizawa ........................ 380/20
5,355,162  10/1994  Yazolino et al. ................. 384/11
5,625,651  4/1997  Cioffi ............................... 375/354

*Primary Examiner*—Chi H. Pham
*Assistant Examiner*—Bryan Webster
*Attorney, Agent, or Firm*—William J. Burke

[57] ABSTRACT

In a information distribution system, a control channel modem that provides independent communications channels for bi-directional message traffic between a service provider and a set-top terminal located within a subscriber's home. The modem transmits messages, control information and status information between the service provider and the subscriber's set-top terminal using an independent channel (downstream path) that is different from the channel (upstream path) used for sending requested information such as movies from the service provider to the subscriber's home.

12 Claims, 7 Drawing Sheets

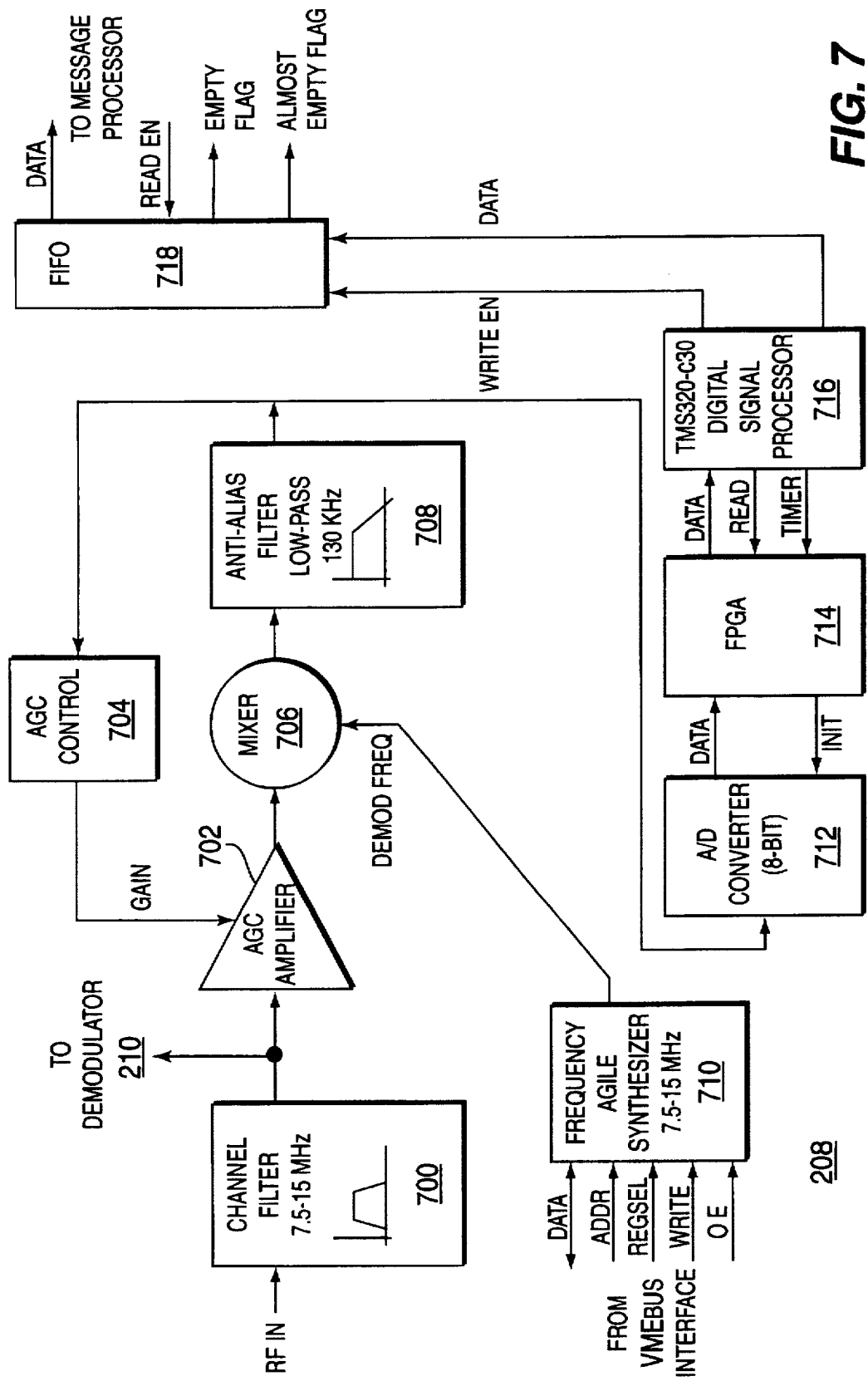

METHOD AND APPARATUS FOR PROVIDING CONTROL CHANNEL COMMUNICATIONS FOR AN INFORMATION DISTRIBUTION SYSTEM

The invention relates to information distribution systems and, more particularly, to a method and apparatus for providing control channel communications for an information distribution system.

BACKGROUND OF THE DISCLOSURE

Recent advances in digital signal processing techniques and, in particular, advancements in digital compression techniques, have lead to a plethora of proposals for providing new digital services to the customer's home via existing telephone and coaxial cable networks. For example, it has been proposed to provide hundreds of cable television channels to subscribers by compressing digital video, transmitting the compressed digital video over conventional coaxial television cables, and then decompressing the video at the subscriber's set-top terminal. Another proposed application of this technology is a movie-on-demand video system in which a subscriber communicates directly with a video service provider via telephone lines to request a particular video program from a video library, and the requested video program is routed to the subscriber's home via telephone lines or via the coaxial television cables for immediate viewing.

Within these systems, control information to facilitate operation of the set-top terminal within the subscriber's home is typically sent as control packets within the video data stream. These control packets contain certain header information which enables the set-top terminal to differentiate between video data and control data. Consequently, the use of packets for sending control data through the video data channel inherently reduces the amount of bandwidth that is available for transmitting video information to the subscriber.

Additionally, the control information that is sent from the set-top terminal to the service provider is typically sent via the telephone system. As such, the subscriber is required to have a dedicated telephone line to provide interactive functionality for the video system. Furthermore, the low data rate of the telephone system does not permit extensive communications between the set-top terminal and the service provider. As such, these systems generally provide rudimentary control commands such as selection of a service or particular information via a menu on the subscriber's television screen.

Therefore, there is a need in the art for a method and apparatus that provides an independent control channel for carrying control information from a set-top terminal to a service provider of an information distribution system without impacting the information bandwidth carrying information to the set-top terminal from the service provider.

SUMMARY OF THE INVENTION

The disadvantages heretofore associated with the prior art are overcome by the present invention of a control channel modem that provides independent communications channels for bi-directional message traffic between a service provider and a set-top terminal. Using the present invention, messages, control information, and status information are transmitted between the service provider and the subscriber's set-top terminal using an independent channel that is different from the channel used for sending requested information such as movies from the service provider to the subscriber's home. In particular, the invention provides one downstream data channel and two upstream channels. The downstream channel connects the service provider to the set-top terminal via a channel having a data rate of approximately 750 kbps per second. The two upstream data channels connect the set-top terminal to the service provider, each have an effective data rate of approximately 43.5 kbps per second.

Specifically, an information distribution system generally contains an information server that is connected to a forward data communications channel having a high bandwidth that carries video information from the server to a subscriber's set-top terminal. The server generally contains a bus structure for carrying command and control information. An illustrative bus structure is a VME bus. The present invention connects to the VME bus through a VME bus interface. Messages, control information and status information that are to be handled by a specific modem are extracted from the VME bus by the VME bus interface and passed to a message buffer and status register. After buffering, a message processor and router produces messages that are addressed to a particular set-top terminal. These messages are then transmitted to a modulator that quadrature modulates the message information onto a carrier which is then propagated through a power amplifier onto a cable network.

Messages from the set-top terminal are demodulated by a pair of demodulators which extract the messages from the two upstream data channels. The upstream data is also quadrature modulated onto a carrier frequency that is processed by the demodulators to extract the message information. The message information from each of the demodulators is passed to the message processor and router which then sends the messages to the message buffer where they await the VME bus interface to pass the messages from the set-top terminal to the service provider's server.

BRIEF DESCRIPTION OF THE DRAWINGS

The teachings of the present invention can be readily understood by considering the following detailed description in conjunction with the accompanying drawings, in which:

FIG. 7 depicts a block diagram of a first demodulator.

To facilitate understanding, identical reference numerals have been used, where possible, to designate identical elements that are common to the figures.

DETAILED DESCRIPTION

Figure 1:
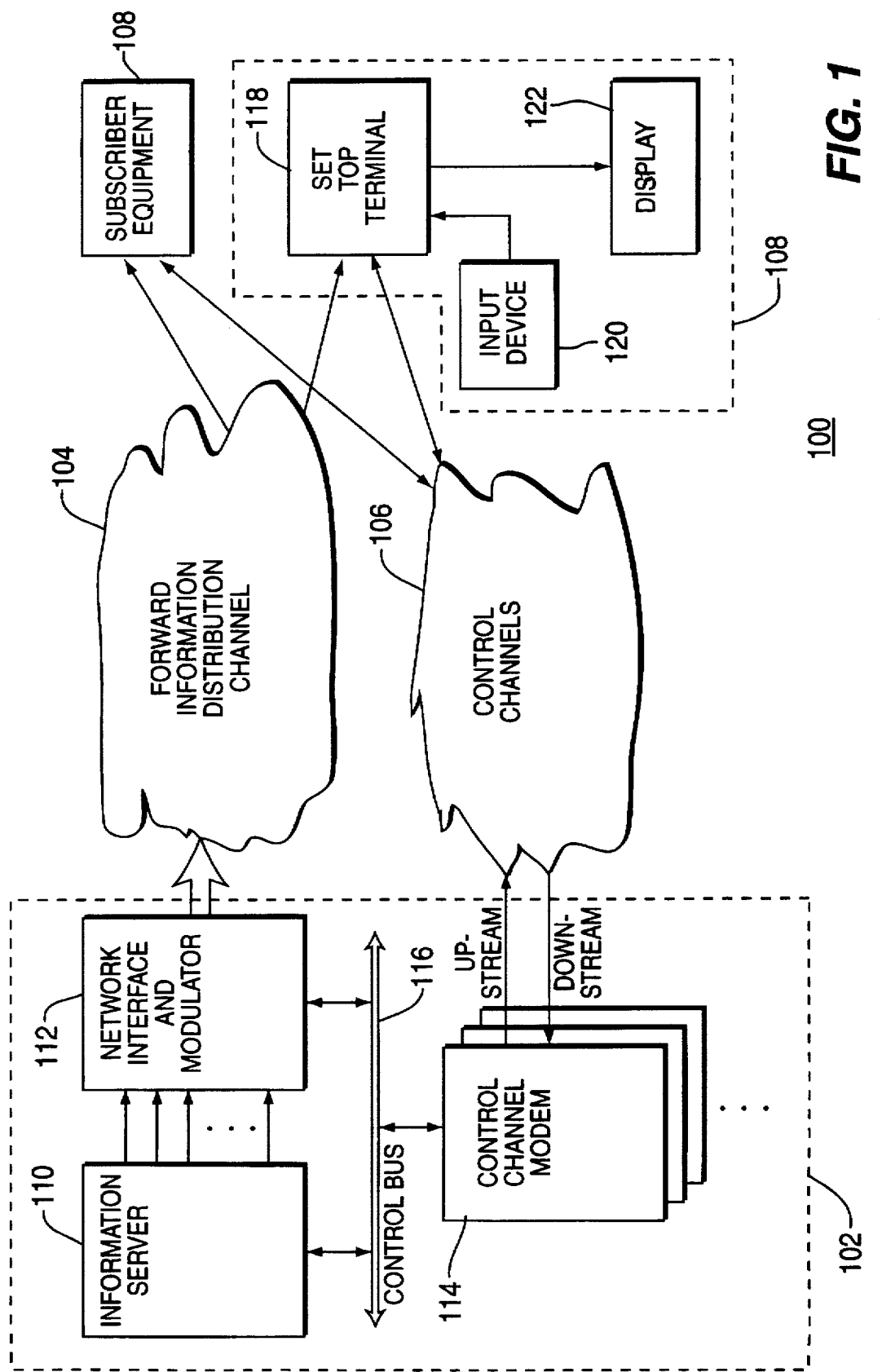
FIG. 1 depicts a high-level block diagram of an interactive information distribution system that incorporates the present invention.

FIG. 1 depicts a high-level block diagram of an interactive information distribution system 100. The system 100 contains service provider equipment 102 connected to a plurality of subscriber equipment 108 via both a forward information distribution channel 104 and a plurality of bi-directional control channels 106 containing a unidirectional upstream control channel and a unidirectional downstream control channel. A subscriber, by interacting with the subscriber equipment 102 located in their home, may request information via the control channel 106 from the service provider's equipment 102. The requested information is transmitted from the service provider equipment 102 through the forward information distribution channel 104 to the subscriber equipment 108 that requested the information. For example, the subscriber may request a particular movie via the control channel, and the service provider equipment will retrieve that movie from memory and "play" the movie through the forward information distribution channel 104 for display on the subscriber's equipment 108. Movie selection information, status messages and control messages are sent from the service provider's equipment 102 through the control channel 106 (the unidirectional upstream control channel) to the subscriber's equipment 108. Responses to those messages, as well as queries for the service provider's equipment, are sent from the subscriber's equipment 108 through the control channels 106 (the unidirectional downstream control channel) to the service provider equipment 102. Consequently, the system depicted in FIG. 1 is a fully interactive, real-time information distribution system.

More specifically, service provider equipment 102 contains an information server 110, a network interface and modulator 112, a control channel modem 114 and a control bus 116 which interconnects the information server 110, the network interface and modulator 112 and the control channel modem 114. In a practical system which services a large number of subscriber equipment (e.g., 3,000 or more), a plurality of network interface and modulator circuits 112 and a plurality of control channel modems 114 are incorporated within the service provider equipment 102.

Commands from the subscriber enter the service provider equipment via a downstream channel connected to the control channel modem 114. The control channel modem interprets these commands and places the received control and message information upon the control bus 116. This information is transmitted to either the information server or the network interface and modulator to control the information that is being sent to the particular set-top terminal that has requested that information. The information server, in response to the control information from the subscriber, executes certain software which may, for example, generate particular menus for the subscriber to select certain information or send particular information requested by the subscriber. A plurality of high-data rate channels connect the server to the network interface and modulator 112. The network interface and modulator takes each of the data streams that are transmitted on these channels and packetizes those data streams into a format that is compatible with the forward information distribution channel. Typically, such packetization conforms to a particular transmission standard such as the Moving Pictures Experts Group (MPEG) standard for video information transport. Other standards may be implemented such as asynchronous transfer mode (ATM).

Certain messages may be sent to the subscriber equipment for display. These messages are passed from the server, through the control bus to the control channel modem and sent on an upstream control channel to the subscriber equipment 108. The forward information distribution channel and the control channel are frequency multiplexed onto a coaxial cable network which may be hybrid fiber-coax cable network and the like.

The subscriber equipment 108 generally contains a set-top terminal 118, an input device 120 and a display device 122. The set-top terminal contains electronics which interact with both the control channels and the information distribution channel as well as processing input commands from the input device. The input device 120 is typically a remote control unit that interacts with the set-top terminal 118 via either an RF or an IR link. The display 122 is typically a conventional television or monitor.

The set-top terminal demodulates and processes the information from the distribution channel as well as control channel information. In addition, it processes the control information from the input device and appropriately transmits that information via the upstream control channel to the control channel modem within the service provide equipment.

Figure 2:
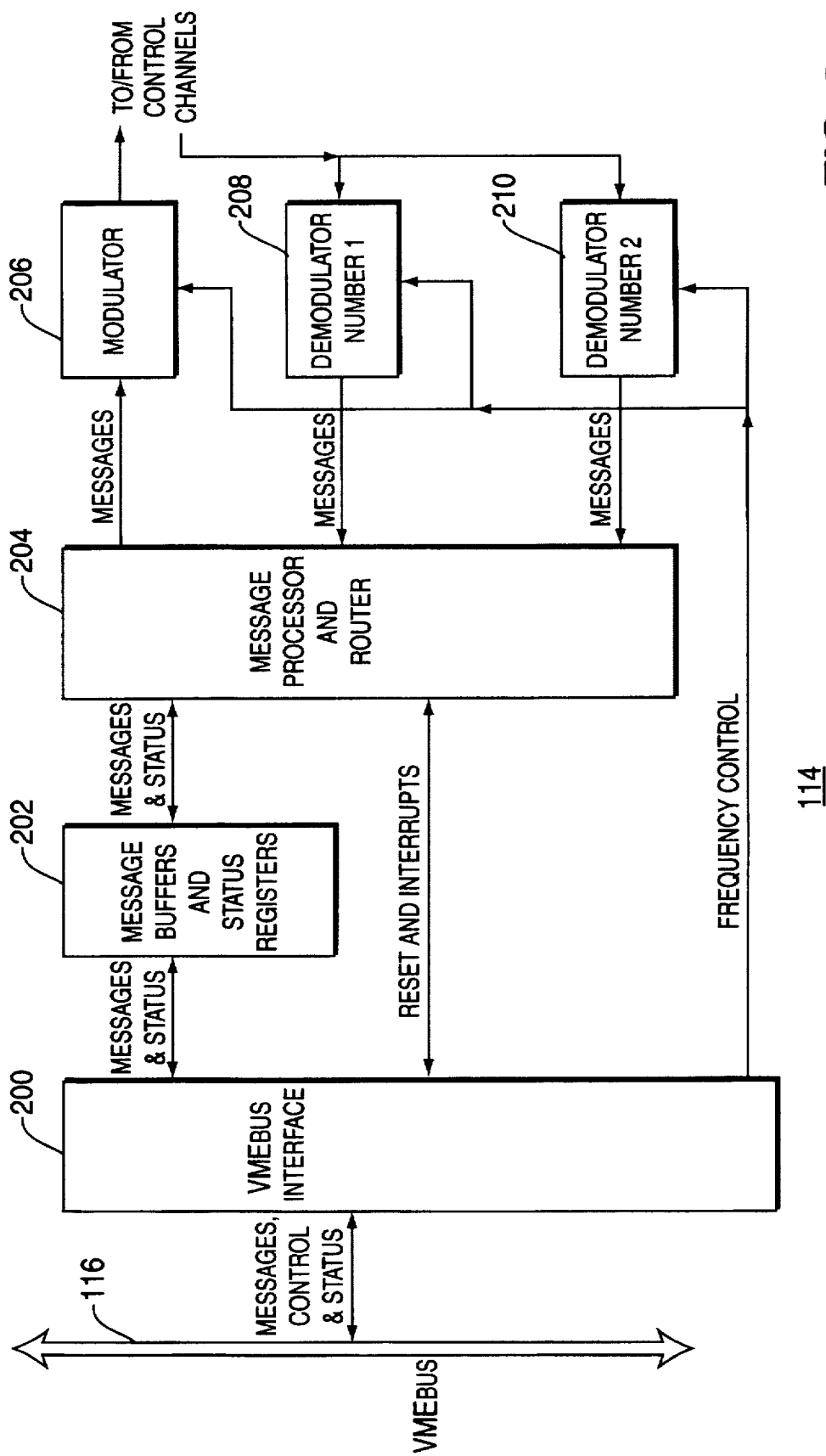
FIG. 2 depicts a high-level block diagram of the control channel modem of the present invention.

FIG. 2 depicts a block diagram of the control channel modem 114 of FIG. 1. The control channel modem 114 contains a bus interface (e.g., a VME bus interface), message buffers and status registers 202, a message processor and router 204, a modulator 206, and a pair of demodulators 208 and 210. The bus interface is connected to the control bus 116. One such bus appropriate for this application is a VME bus which is well-known in the art for carrying messages, control information and status information between digital devices.

The bus interface extracts information from the bus that is addressed by the server to a particular control channel modem. The messages are temporarily stored in a plurality of message buffers and status registers 202. At appropriate times, the message buffers and status registers are emptied, and their information is passed to the message processor and router 204. Additionally, certain reset and interrupt information may be sent via the VME bus to the control channel modem. This information is generally not buffered and is directly passed from the VME bus interface to the message processor and router 204 for immediate execution. Upstream messages are passed from the message processor and router 204 to the modulator 206. The modulator quadrature modulates a carrier with the message information and couples the modulated carrier to the upstream control channel. The particular frequency used for transmitting a particular message is controlled by the server. Thus, this information is carried by the control bus and interpreted by the bus interface which couples the frequency control information to the modulator.

Downstream information is supplied from the control channels to the pair of demodulators 208 and 210. A pair of demodulators is used to reduce the probability of a message collision at the modem. Each demodulator is a quadrature demodulator which extracts the message information from the control channel and couples that message information to the message processor and router 204. This message information is then buffered within the message buffers and status registers 202 and ultimately passed to the bus interface 200 which couples the message information to the control bus 116 for communication to the information server or the network interface and modulator.

Figure 3:
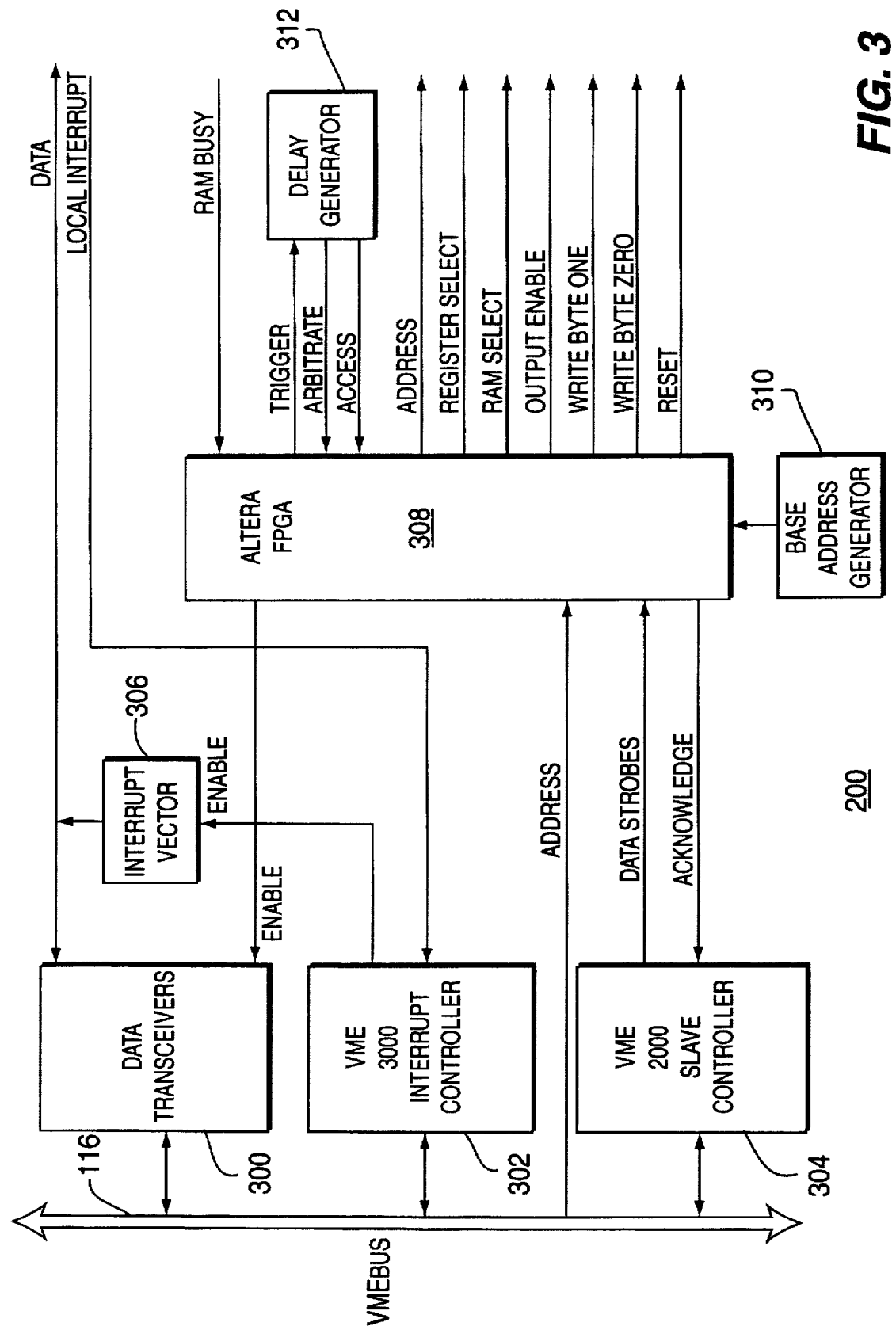
FIG. 3 depicts a block diagram of the VME interface.

FIG. 3 depicts a detailed block diagram of the bus interface 200, in particular, a VME bus interface. This bus interface provides the interface between the control channel modem 114 and the control bus 116. All communications between the control channel modem and the control bus take place as memory-mapped operations within the control bus interface 200. The interface 200 supports the following VME bus modes: A16, D16 (word dated transfers) for registers and buffers, and D8 (EO) (byte data transfers) for buffers. Furthermore, the bus interface 200 contains data transceivers 300, interrupt controller 302, slave controller 304, interrupt vector generator 306, a field programmable gate array (FPGA) 308, a base address generator 310, and a delay generator 312. The interrupt controller is a VME 3000 (VME bus interrupt generator) available from PLX Technology. Similarly, the slave controller is a VME 2000 "VME bus slave module interface device" also available from PLX technology. The data transceiver 300, the interrupt controller 302 and the slave controller 304 are each connected directly to the VME bus. The slave controller 304 monitors the VME data transfer bus signals to determine the type of access being performed. The slave controller 304 produces data strobes and acknowledge information that is coupled to the FPGA 308. The gate array 308 (available from Altera) interprets the data strobes using an address comparator to insure that the access that is being requested is appropriate. Unsupported access attempts are ignored by the FPGA. During valid transactions, the gate array drives the local address bus, enables the data transceivers, and provides the appropriate select and enable signals for either register or RAM accesses. The gate array then acknowledges the access to the VME bus through the slave controller 304.

The interrupt controller 302 accepts a single level local interrupt from the control channel modem. When a local interrupt is detected by the interrupt controller, the controller generates an interrupt to the VME bus, and handles the resulting interrupt arbitration via the VME priority interrupt bus. The interrupt control operates in an ROAC (Reset On Acknowledge) mode, and the VME interrupt is cleared upon response from the VME controller. As part of the interrupt arbitration process, the interrupt controller provides the VME controller with an 8-bit interrupt vector via the data bus. As such, the interrupt controller 302 is coupled via the enable port of the interrupt vector generator 306 such that upon enabling the interrupt vector generator, the vector is placed on the data bus for the data transceivers to couple to the VME bus. The VME bus addressing is coupled directly to the FPGA. The FPGA is discussed further with respect to FIG. 5.

Figure 4:
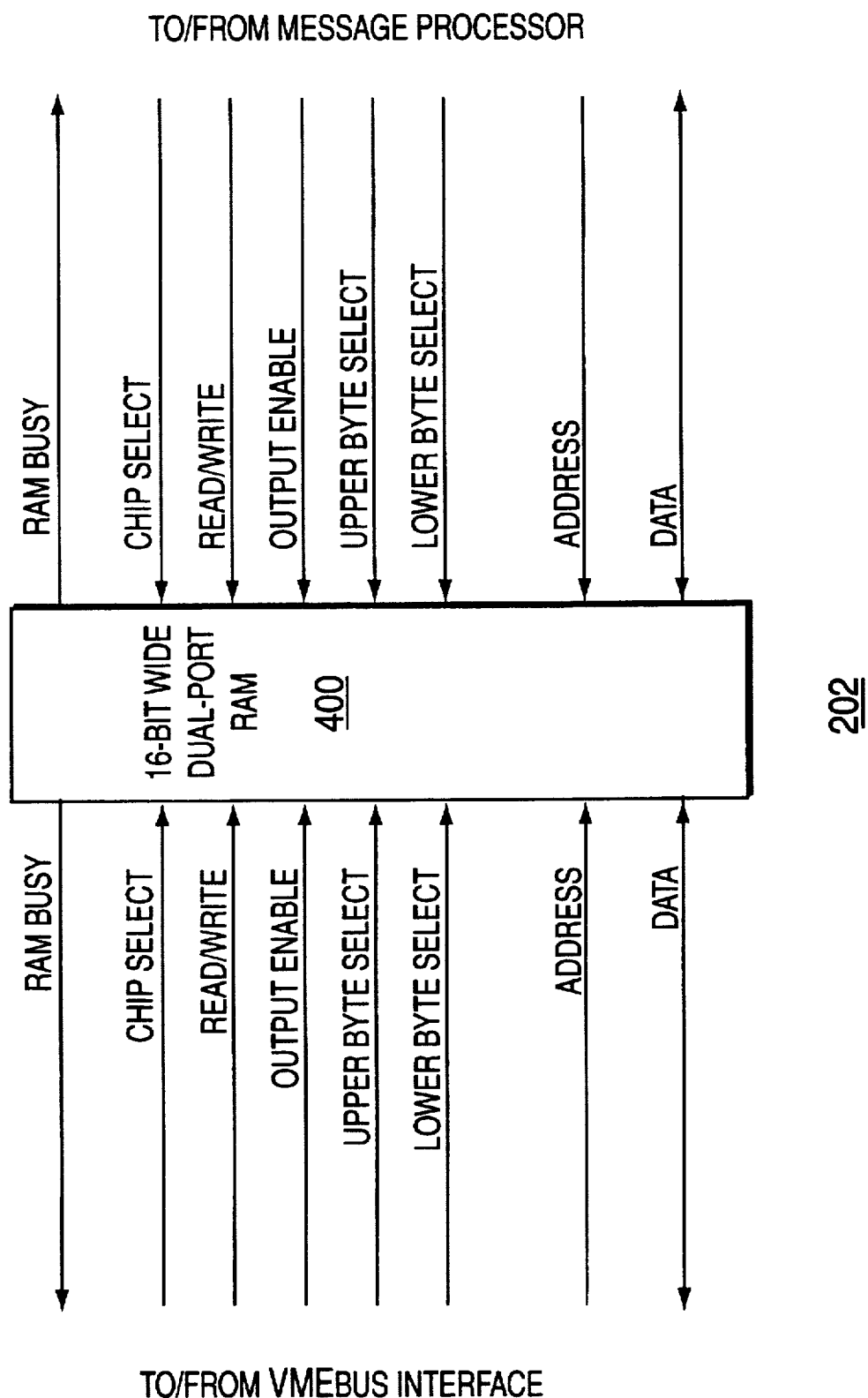
FIG. 4 is a block diagram of the message buffer and status register.

FIG. 4 depicts a block diagram of the message buffers and status registers 202. The registers and buffers and implemented using a 16-bit wide dual-port RAM 400. The RAM 400 contains complete pairs of input/output ports, including RAM busy, chip select, read/write, output enable, upper byte select, lower byte select, address and data. A complete set of ports are connected to the VME bus interface and the message processor. As such, both of these units may access the dual port RAM simultaneously.

This RAM is partitioned into two buffer pages; one for each modulator and demodulator, and the memory contains a status register for each page. For the modulator, the status register is used to inform the server if a page is available to be written (has already been transmitted), and if the modulator is generating an interrupt. An interrupt may be generated when a demodulator buffer page becomes available for transfer to the server. The demodulator buffer page also has a status register associated with it. This register contains information regarding messages that have been received from the subscriber equipment. The status register contains a number of fields including a field that indicates when the buffer is available for writing, a field that indicates when a new message has been deposited in the buffer, an indicator bit that is set whenever a dropped message could not be placed into the buffer, an overflow error field which indicates that a message has been received that is longer than the specification permits and that the message has been truncated, and a length field that indicates the length of the received message in bytes.

During normal operation of the buffer, the server, via the VME interface and the message processor are synchronized such that, for each subsystem, one device accesses buffer page 0 while the other subsystem accesses the buffer page 1. When complete, the devices toggle which page they are using. This approach provides the maximum processing time to each device, and minimizes the likelihood of an access collision within the memory.

Unlike the buffer pages, it is possible that both the server and the message processor would access the same status register. For example, the message processor may poll the modulator status register to check for a new message while the server is updating the status. To avoid erroneous results, the arbitration capabilities of the memory are utilized. If the memory reports a busy condition, the access by the message processor is held off by use of the DTACK signal, while accesses via the VME bus are held off by a delay of the VMEACK signal by the VME bus interface. Such access control is handled by the programmable gate array 308 of FIG. 3 in conjunction with the delay generator 312 that delays the access signal from the VME bus when the RAM busy flag is high.

Figure 5:
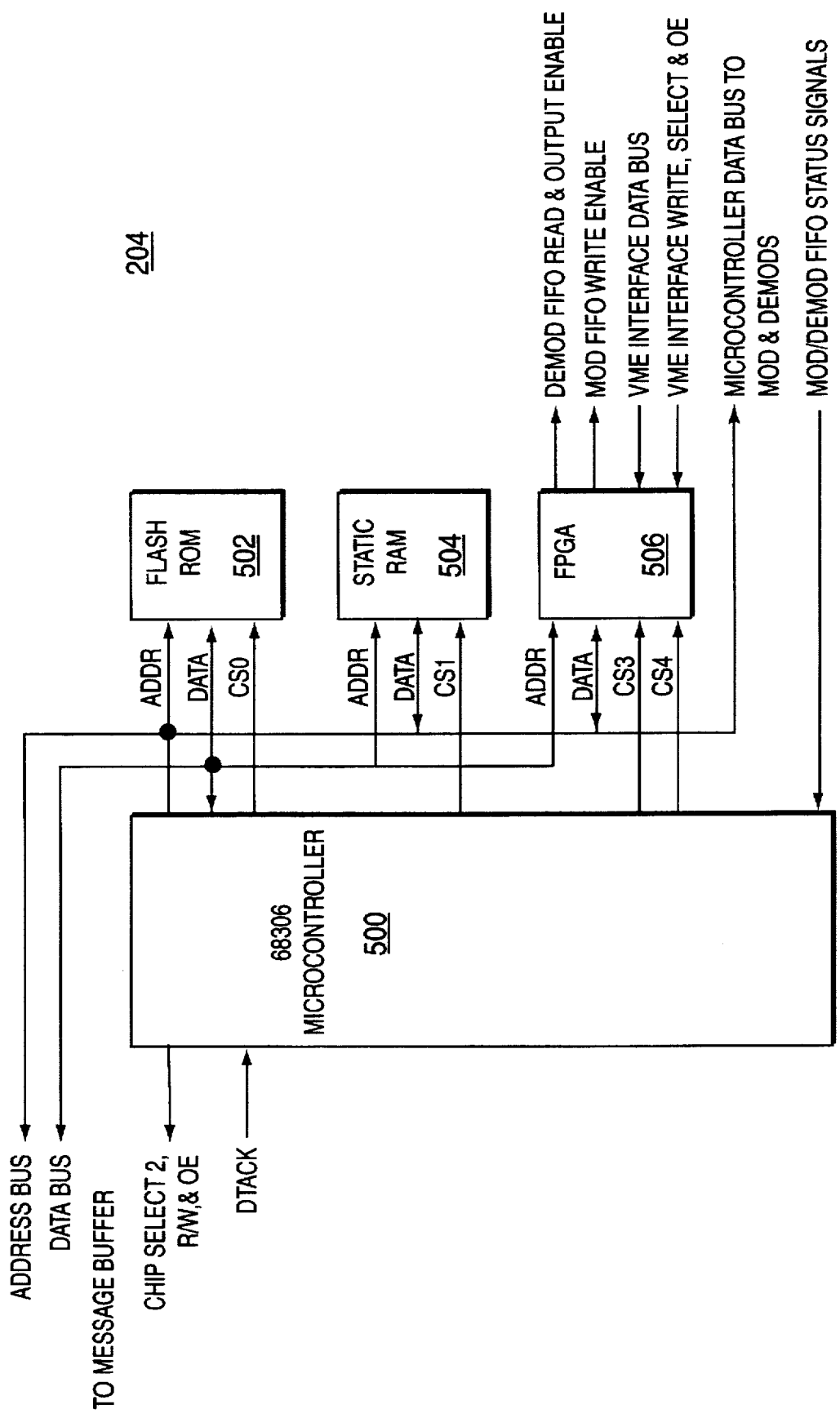
FIG. 5 is a block diagram of the message processor.

FIG. 5 depicts a block diagram of the message processor and router 204 of FIG. 2. The message processor and router 204 contains a microcontroller 500, a flash read-only memory (ROM) 502, a static random access memory (RAM) 504, and a field programmable gate array (FPGA) 506. The purpose of the message processor and router is to read and format outgoing messages from the message buffers and send them to the modulator, and accept incoming messages from either demodulator and transfer those messages to the message buffer. As such, the microcontroller is connected to the message buffer to control read/write, output enable and chip select functions. Also, the DTACK signal is coupled from FPGA 308 of FIG. 3 to the microcontroller 500. The DTACK signal is decoded from the "Ready" signal of the dual-port RAM. If the RAM is ready, a DTACK is generated. If it is not ready, the DTACK is delayed until the RAM is Ready. For other registers which are not shared with other devices (i.e., not held within the Dual-Port RAM), the ready signal is always active. The microcontroller's data bus is connected to the modulator and both demodulators as well as to the ROM 502, RAM 504, and FPGA 506. The address bus for the microcontroller is also connected to the ROM, RAM, and FPGA, as well as to the message buffer (400 of FIG. 4).

The FPGA 506 forms an interface between the microcontroller and the demodulators as well as the VME interface bus. Specifically, FPGA 506 generates demodulator FIFO read and output enable signals and modulator write enable signals. Also, modulator and demodulator FIFO status signals from the modulators and demodulators are coupled directly to the microcontroller. The FPGA generally contains the reset and interrupt registers used by the VME interface that are not contained within the buffer memory. Note that access to either the reset or interrupt register by the VME bus initiates a level four interrupt to the microcontroller. This interrupt may be disabled via a physical jumper on the circuit board.

Typically, an illustrative microcontroller useful in the present invention is a 68306 microcontroller available from Motorola. The reset and interrupt registers are used to enable the server through the VME bus to completely reset the control channel modem as well as independently interrupt and reset certain components of the control channel modem such as the modulator or either demodulator.

Figure 6:
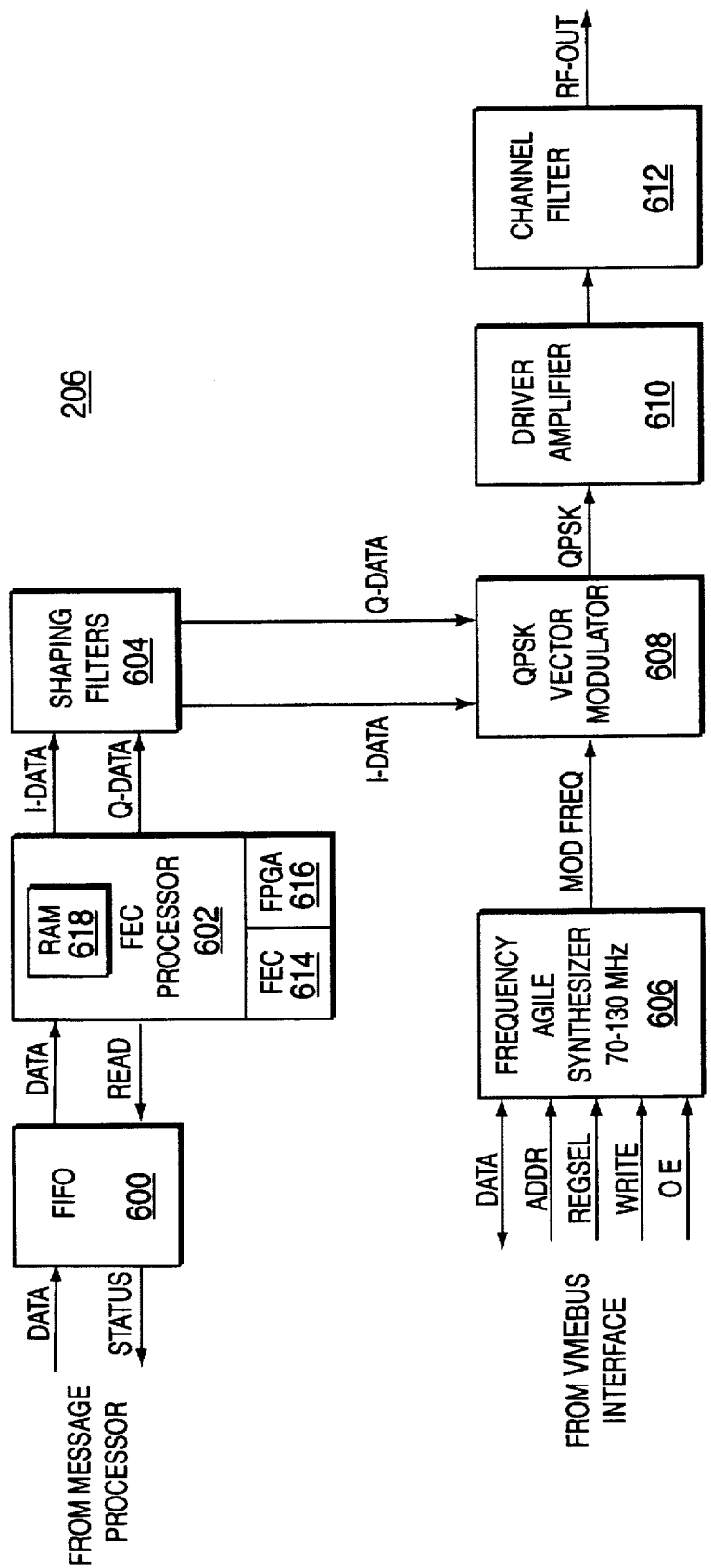
FIG. 6 is a block diagram of the modulator.

FIG. 6 depicts a block diagram of modulator 206. The modulator contains a first-in/first-out (FIFO) buffer 600 for outgoing message traffic, a forward error correction (FEC) processor 602, shaping filter 604, a frequency agile synthesizer 606, a quadrature phase shift key (QPSK) vector modulator 608, a driver amplifier 610, and a channel filter 612. The FIFO 600 receives data from the message processor in the form of a series of messages that are placed within serial memory locations within the FIFO. A status line is connected from the FIFO to the message processor to inform the microcontroller of the FIFO status, i.e., whether the FIFO can accept further data for buffering. The FIFO 600 is connected to the FEC processor 602 by two paths. The first path is a read path that connects an address generator within the FEC processor to the FIFO to request specific data from the FIFO memory. That data is passed on a data path between the FIFO and the FEC processor 602. The FEC processor, in a conventional manner, generates quadrature data, i.e., in-phase data (I-DATA) and quadrature data (Q-DATA) that is coupled to the shaping filters 604. The I and Q data also contains the forward error correction coding that facilitates effective error correction of the received data by the demodulator within the set-top terminal.

Each message that is placed in the FIFO contains 184 bytes of data. Generally, these messages (message blocks) contain eight set-top terminal messages of 23 bytes each, and any messages that are unused within a block are filled with zeros to fulfill the 184 byte requirement. Each 23 byte message contains two bytes for an address of a set-top terminal, one byte for a message length indicator, one byte for a control indicator, one byte for a sequence number, and 18 bytes of data. The message processor also appends to each message a 4-byte header before the message is transferred to the FIFO. The header is a transport protocol header, e.g., an MPEG transport packet header.

The I- and Q-data streams have bit rates of 500 kbps. The FEC processor is illustratively a Xilinx programmable FEC device 614 combined with Altera field programmable gate array (FPGA) 616 and a 32K×8 RAM 618. The FPGA provides two functions in support of the FEC device. Since the FEC device 614 is serial in nature, the first function of the FPGA 616 is to read data from the FIFO 600 and convert the byte-wide data to a serial stream. This stream is transferred under control of the FEC device 614 which periodically stops the stream in order to insert an FEC check sum. The second function of the FPGA 616 is to convert the serial stream produced by the FEC device 614 to I- and Q-data streams. This is accomplished by simply transferring all odd bits and all even bits to alternating output ports. The I- and Q-data is reclocked to maintain alignment at the output of the FPGA. The FEC device 614 performs the functions of scrambling, interleaving and Reed-Solomon forward error correction coding the data. The RAM 618 is used by the FEC device 614 during interleaving. Every 94 bytes (twice per packet), the incoming data stream is halted and two bytes of FEC coding are incorporated into the data stream.

After processing by the FEC processor 602, the dual data streams are passed through shaping filters 604 prior to modulation. These filters are based on a four-pole Bessel design, as an approximation to a raised cosine passband shape. The 50% point of the filter is at 650 kHz, providing 30% excess bandwidth for 500 kbps data streams.

In order to generate the appropriate modulation frequency, a varactor-tuned phase lock loop (PLL) synthesizer 606 is provided. The frequency of modulation is set by the server via a memory-mapped register within one of the FPGAs. Alternatively, the frequencies are stored in the dual-port RAM. The resolution of frequency selection is 2 MHz, meaning that incrementing the register value by one increases the modulation frequency by 2 MHz. Valid settings for this register are 35 to 65 (decimal) resulting in a frequency range of 70 to 130 MHz.

Modulation of the I and Q data streams is accomplished by a monolithic, QPSK vector modulator 608. One such commercially available modulator is the HPMX-2005 manufactured by Hewlett Packard. This modulator is followed by an HPMX-3002 drive amplifier 610, which provides up to 23 dBm of saturated output power. The specific gain of this device is set by an adjustment on the circuit board.

The QPSK vector modulator 608 conventionally modulates the synthesizer frequency with the I-data and Q-data provided by the shaping filters 604. The drive amplifier 610 then amplifies the RF modulated QPSK signal and couples the amplified signal to a channel filter 612. As such, the amplified signal is filtered to eliminate spurious energy outside the frequency band of 70 to 130 MHz. This filter is a passive bandpass device, based on a 3 pole Butterworth filter.

FIG. 7 depicts one of the two demodulators 208 and 210 in block diagram form. Both demodulators are identical. The channel filter 700 that is located at the input of the demodulator is shared by both the demodulators 208 and 210. This is the only component of the demodulators that is shared. The demodulator 208 contains a channel filter 700, an AGC amplifier 702 and its control circuitry 704, a frequency mixer 706, an anti-alias filter 708, a frequency agile synthesizer 710, an analog-to-digital (A/D) converter (ADC) 712, gate array 714, digital signal processor (DSP) 716, and an output buffer FIFO 718. The channel filter 700 limits the frequencies that are presented to the demodulator subsystem. This filter is a third order Butterworth device with 3 dB points at 7.5 and 15 MHz. Its input impedance is 75 ohms. While this filter removes interfering signals outside the allowable uplink frequency range it does not affect any signals within the allowable uplink band.

The channel filter is immediately followed by an automatic gain control amplifier 702 which is used to maintain a constant amplitude signal into the A/D converter 712. The AGC circuit 704 samples the signal of the input of the A/D converter 716. Circuit 704 produces a gain control signal in response to the magnitude of the sample and couple the gain control signal to the AGC amplifier 702. Alternatively, the AGC amplifier 702 is replaced with a simple clamp (hard limiter) that limits the signal magnitude coupled to the mixer 706.

The AGC amplifier is followed by a mixer 706 that performs a direct down conversion to near baseband of the received signal. To decrease hardware complexity the mixer 706 performs the function of an I only demodulator. Since the local oscillator 710 is not locked to the incoming signal it is quite possible that received information is in quadrature with this oscillator. Since the incoming data stream is received at 62.5 kilobits per second, down converting the signal to a center frequency of 62.5 KHz allows the I/Q separation to be accomplished in the DSP processor. The mixer 706 is followed by an anti-aliasing filter 708 prior to the analog to digital converter (ADC). This filter is a low pass, fifth order Butterworth device with a flat response to 130 KHz, and a loss of 29 dB at 260 KHz.

Conversion of the anti-aliasing filter's output is provided by an 8-bit ADC under control of the digital signal processor 716. The DSP's timer is set to generate pulses at the desired sample rate of 255 ksps. These pulses are interpreted by the field program gate array 714 and initiate a conversion by the ADC. Once conversion is complete, the result is held in the FPGA 714 until the data is read by the DSP 716. If the DSP 716 requests the data before conversion is complete, DSP operation is delayed via memory wait state insertion until the conversion is complete.

Illustratively, the digital signal processor is a TMS320C30 manufactured by Texas Instruments. As is well known, this DSP demodulates the I and Q components of the input data signal, maintains a symbol alignment using a timing loop and performs carrier recovery which derotates the incoming signal. The resulting bit stream is then processed to locate message headers which determine message alignment. Once the message has been identified it is written to the FIFO 718 for transfer to the message processor in byte format. An additional bit is also written to the FIFO to indicate a start of a message.

The data is presented from the FIFO to the message processor in byte wide quantities with an additional bit indicating start of message. A start bit is connected to input D15 of the microcontroller data bus while the data bits are connected to pins D7–D0. Incoming messages are variable in length and may consist of 7 to 23 bytes. Note that any channel synchronization headers have been stripped off by the demodulator. The demodulator message format is similar to the modulator message format and contains an address field having a two byte length that identifies the set-top terminal that sends the message, a message length field of one byte, a control field of one byte, a sequence field of one byte, a data field having a variable number of bytes (the maximum being 16 bytes), and a CRC field having two bytes. The message processor monitors the status of the demodulator FIFOs 718 via their empty and almost empty flags to determine the presence of incoming messages. If a message is received, the message processor first checks the status register for the currently selected message buffer to determine if it is available. If it is available, the message processor begins transferring bytes from the FIFO 718 to the message buffer. Since the uplink data rate is quite slow, the message processor must take care as not to underflow the FIFO 718 during the transfer.

During the message transfer, the message processor checks the value of the length field in the incoming data. This field indicates to the message processor the length of message including the control, sequence, data, and CRC fields. Since messages are variable in length this value is used to determine how many bytes to transfer from the FIFO. The start of message bit may be used as confirmation as to message length, but is not available until the next message is received. Note that the CRC field value is transferred directly to the message buffer and its validity is not checked by the message processor. The validity is checked by a server subsystem or network interface.

Valid values for the length byte are 4 through 20. If a message having a length of greater than 20 is received, the message transfer is truncated after 23 bytes, and the start of message bit must be used to resynchronize the next incoming message.

Once a complete message has been received the status register for the message buffer is updated. The buffer available for write bit is cleared, the interrupt pending bit is set, and the length field is set to total message length, e.g., received message length plus 3 bytes as defined by the transport protocol. Additionally, an appropriate bit in the interrupt register is set to indicate whether an interrupt is pending for either demodulator or the modulator. If the message has been truncated, the overflow bit is also set.

In the event that a message is received and a check of the status register indicates the buffer is not available, the message processor checks the demodulators other buffer for availability. This permits recovery if toggle synchronization with the server is lost. If indeed neither buffer is available, the message processor disposes of the incoming messages and updates the demodulator status register by setting the message dropped bit. The message processor also insures that the interrupt pending bits in the status register and interrupt register are set.

Although various embodiments which incorporate the teachings of the present invention have been shown and described in detail herein, those skilled in the art can readily devise many other varied embodiments that still incorporate these teachings.

What is claimed is:

1. In an information distribution system including service provider equipment and service subscriber equipment, said service provider equipment sending upstream messages to said set-top terminal via at least one upstream path and receiving downstream messages from said set-top terminal via a downstream path, said service provider equipment comprising an information server coupled to a control channel modem via a data bus, said control channel modem comprising:

a bus interface, coupled to said data bus, for receiving upstream messages and control commands from said information server, and for coupling downstream messages to said information server;

a message buffer, coupled to said bus interface, for temporarily storing upstream and downstream messages; and a message processor, coupled to said message buffer, for retrieving upstream messages from the message buffer and routing the upstream messages to a modulator, and for routing downstream messages from a demodulator to said message buffer, where said modulator is coupled to said upstream path and said demodulator is coupled to said downstream path.

2. The control channel modem of claim 1 wherein said message buffer is a dual port random access memory having the bus interface addressing a first set of ports to retrieve said downstream messages from the dual port random access memory and store said upstream messages in the dual port random access memory, and having a second set of ports coupled to said message processor to retrieve said upstream messages from the dual port random access memory and store said downstream messages in the dual port random access memory.

3. The control channel modem of claim 2 wherein said message buffer is bifurcated into two pages, where a first page stores upstream messages and a second page stores downstream messages.

4. The control channel modem of claim 1 wherein said message processor is a microcontroller that is controlled by said control commands from said bus interface.

5. The control channel modem of claim 1 further comprising a second demodulator.

6. In an information distribution system including service provider equipment and service subscriber equipment, said service provider equipment sending upstream messages to said set-top terminal via at least one upstream path and receiving downstream messages from said set-top terminal via a downstream path, said service provider equipment comprising an information server coupled to a control channel modem via a data bus, a method of using said control channel modem comprising the steps of:

a) transmitting a first message from said information server to said set-top terminal comprising the steps of:
   receiving, via said data bus, said first message information from said information server;
   storing said first message information in a message buffer;
   retrieving said first message information from said message buffer;
   modulating said first message information that is retrieved from said message buffer onto a transmission carrier frequency to produce a first message;
   coupling the first message to said upstream path;
b) receiving a second message, via said downstream path, from said set top terminal comprising the steps of:
   demodulating said second message to produce second message information;
   storing said second message information in said message buffer;
   retrieving said second message information from said message buffer in response to a request from said information server, said control modem receiving said request via said data bus; and
   coupling said retrieved second message information to said information server via said data bus.

7. The method of claim 6 wherein said message buffer is a dual port random access memory.

8. The method of claim 6 wherein said message buffer is bifurcated into two pages, where a first page stores said first message information and a second page stores said second message information.

9. The method of claim 6 wherein the modulating step further comprises a step of adding a transport protocol header to said first message information.

10. The method of claim 6 wherein said modulating step uses quadrature phase shift key modulation.

11. The method of claim 6 wherein said receiving and transmitting steps occur simultaneously.

12. The method of claim 6 wherein said step of retrieving said second message information is delayed whenever said step of retrieving said first message information occurs simultaneously with said step of retrieving said second message information.

* * * * *